United States Patent [19]

Koike

[11] Patent Number: 5,465,411
[45] Date of Patent: Nov. 7, 1995

[54] DIVERSITY RECEIVER WITH SWITCHING NOISE REDUCTION

[75] Inventor: Yukinaga Koike, Nagano, Japan

[73] Assignees: Nisshin Onpa Co., Ltd.; Circuit Design Inc., both of Nagano; Hoshino Gakki Co. Ltd., Nagoya Aichi, all of Japan; Samsun Technologies Corporation, Hicksville, N.Y.

[21] Appl. No.: 167,332

[22] Filed: Dec. 15, 1993

[30] Foreign Application Priority Data

Jun. 16, 1993 [JP] Japan .................................. 5-144122

[51] Int. Cl.⁶ .................................................. H04B 1/06
[52] U.S. Cl. .................... 455/275; 455/277.2; 455/278.1
[58] Field of Search ..................................... 455/133–136, 455/140, 275, 276.1, 277.1, 277.2, 278.1; 375/100, 102

[56] References Cited

U.S. PATENT DOCUMENTS

| | | | |
|---|---|---|---|
| 4,293,955 | 10/1981 | Gehr et al. | 455/276.1 |
| 4,633,519 | 12/1986 | Gotoh et al. | 455/277.1 |
| 4,756,023 | 7/1988 | Kojima | 455/277.1 |
| 4,878,252 | 10/1989 | Sessink | 455/276.1 |
| 5,203,023 | 4/1993 | Saito et al. | 455/277.1 |

FOREIGN PATENT DOCUMENTS

| | | | |
|---|---|---|---|
| 0168440 | 12/1981 | Japan | 455/277.1 |
| 0017740 | 1/1984 | Japan | 455/277.1 |
| 4045618 | 2/1992 | Japan | 455/277.1 |
| 4262628 | 9/1992 | Japan | 455/277.2 |

Primary Examiner—Reinhard J. Eisenzopf
Assistant Examiner—Andrew Faile
Attorney, Agent, or Firm—Ostrolenk, Faber, Gerb & Soffen

[57] ABSTRACT

A diversity FM receiver of the antenna switching system type which includes first and second antennas, an antenna switching circuit, an FM receiving unit and a sample hold circuit. The receiving unit functions to demodulate the wave signal input thereto and to output a wave detection signal. The switching circuit switches the signal received from one antenna or the other antenna to the receiving unit in accordance with the amplitude of the wave detection signal. The sample hold circuit maintains the voltage of the wave detection signal during switching at the value of the signal immediately before switching.

7 Claims, 3 Drawing Sheets

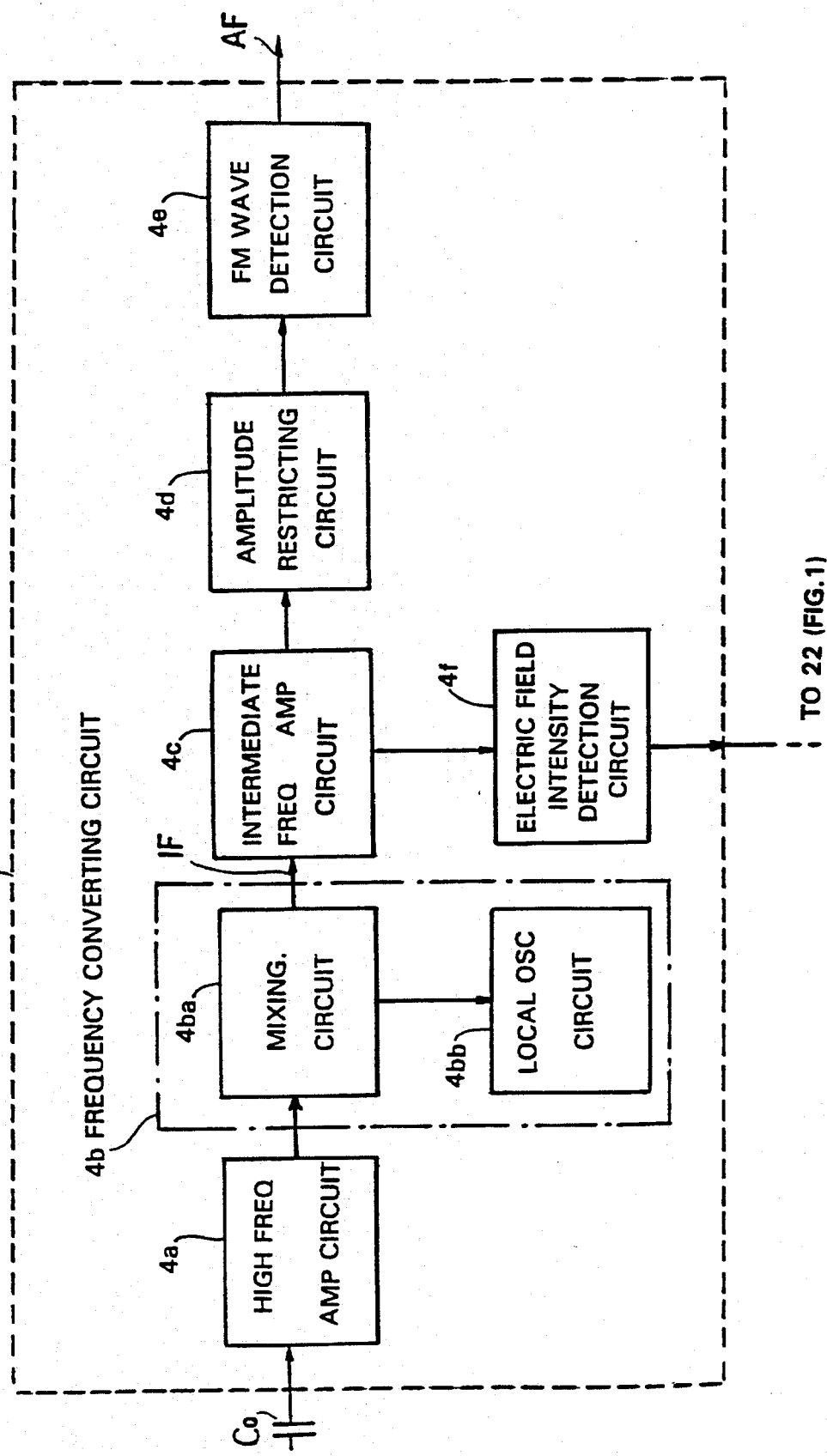

DIVERSITY RECEIVER WITH SWITCHING NOISE REDUCTION

BACKGROUND OF THE INVENTION

1. Field of the Invention

This invention relates to a diversity receiver utilizing a plurality of antennas and, more particularly, to such a diversity receiver employing a phase noise restraining technique for controlling the phase noise due to the phase non-contiguity of the receiving wave seams that are inevitably produced at the time when the receiving wave is switched.

2. Description of the Related Art

One type of prior art diversity receiver is the antenna switching type. This type of diversity receiver comprises a plurality of antennas, an antenna switching circuit and a receiving part and functions to select the antenna whose receiving electric field intensity is high by means of an antenna switching circuit and then introduces the received wave to the receiving part. Therefore, the receiving part can be constructed as a single system, and can result in a diversity receiver of low cost with a reduced number of parts. As an example of the diversity receiver of this kind of antenna switching system, the diversity receiver which is disclosed in Patent Kokai (Laid Open) No. Sho 62-47223 is known. According to said diversity receiver, a switch threshold value is renewed on the medium and high receiving electric field intensity levels, to select the antenna whose receiving electric field intensity is higher. The switch threshold value is fixed at a prescribed value on the low receiving electric field intensity level and antenna switching is repeated many times at the time when the receiving electric field intensity of the plurality of antennas happens to be lower than the lower limit. Switching is terminated at the time when any of the antennas has exceeded the lower limit. The diversity effect is heightened in conformity with the variations in the receiving electric field intensity.

In the case of the aforementioned diversity receiver, antenna switching is carried out frequently on the lower receiving electric field intensity level, with a result that phase non-contiguity arises at the seam (juncture) of the receiving signals due to antenna switching and with a result that is spike noise is produced in the case of the demodulated signal. Since this low receiving electric field intensity level reflects the state in which the quality of the communications is unsatisfactory, the demodulated signal is cut off by a squelch circuit (or a muting circuit), thereby posing no serious problem. On the medium and high receiving electric field intensity levels, on the other hand, phase non-contiguity (phase shift) is inevitably produced at the juncture between the receiving wave prior to switching and the receiving wave after switching due to the antenna distance or the directional character of the receiving wave, etc., even if the switching frequency is low, with a result that phase noise appears in the demodulated signal (such as the sound signal). In the case of a portable radio or radio receiver, where the S/N (signal to noise) ratio is comparatively low, this phase noise is not easily detected as it gets mixed with the external noise. In the case of the receivers of a wireless microphone system or data transmission receivers, etc., where the S/N ratio is high, undesirable foreign noises or signal bits are produced, thereby posing a serious problem in the control of the phase noise.

On the other hand, there has been known a diversity receiver of the synthesizing type, as is described in U.S. Pat. No. 4,293,955, whereby either a signal of zero phase delay or a signal whose phase delay is 180 degrees is switched and synthesized on the basis of the wave that has been received from the second antenna as compared with the wave that is received from the first antenna, with the synthesized wave being introduced to the receiving part of a single system. The reason why a signal whose phase delay is 180 degrees is prepared is that the intensity of the synthesized signal becomes zero at the time when the wave received from the second antenna is shifted by a phase of 180 degrees as compared with the wave that is received from the first antenna. Accordingly, a signal of the reverse phase is prepared beforehand on the basis of the wave that is received from the second antenna and either one of the signals of the regular phase and the reverse phase is switched and added to the received wave from the first antenna so as to elevate the signal intensity of the synthesized wave. Even in a diversity receiver of such a synthesizing system where there is a switching circuit, however, there is produced a phase shift between the synthesized wave prior to switching and the synthesized wave after switching, with a consequence that phase noise inevitably appears in the demodulated signal.

In either of these systems, the diversity receiver of the antenna switching system having the receiving part of a single system has been abandoned due to the extreme difficulty of controlling this phase noise in the past, with a result that the expensive space diversity receiver having the receiving part of two systems has inevitably been put to commercial use.

SUMMARY OF THE INVENTION

In view of the aforementioned object, the purpose of this invention lies in offering a highly reliable and inexpensive diversity receiver which reduces the phase noise of the demodulated signal and which is capable of obtaining a demodulated signal of high quality by controlling the effect of a phase shift, which is inevitably produced in the receiving wave at the time when the receiving wave is switched.

In accordance with the present invention, the foregoing and other objects are achieved by a diversity receiver for receiving signals transmitted at carrier frequencies which includes means including first and second antennas for receiving the signals. Means are provided for processing the received signals in accordance with a first mode or a second mode and for generating a single signal. A receiving unit is provided for demodulating the single signal and outputting a wave detection signal. Also provided are means for detecting the amplitude of the wave detection signal and switching means for switching from one of the first and second modes to the other of said modes in accordance with the detected amplitude of the wave detection signal. Voltage clamping means is provided for fixing the voltage of the wave detection signal during the switching by the switching means from one mode to another mode.

In accordance with one aspect of the invention, in the first mode, the single signal is the signal from one of the antennas, and, in the second mode, the single signal is the signal from the other antenna.

Even though it is possible for the aforementioned voltage clamp means to be an analog memory that supplies the same fixed voltage to the output terminal of the wave detection signal at any switching time, in the sense that fixing is carried out with a voltage that corresponds to the history of the wave detection waveform, it is desirable to provide a sample hold circuit for maintaining the voltage value of the wave detection signal immediately before switching. In such a case, the diversity receiver can be used both in the AM (amplitude modulating type) and the PM (phase modulating type) receivers. However, it is most desirable to use same in FM (frequency modulating type) receivers.

In the case where the diversity receiver includes a deemphasis circuit which attenuates the high range of the wave detection signal that is outputted from the receiving part, the sample hold circuit can play the role of an integrating circuit as well. In other words, the sample hold circuit includes a deemphasis circuit and is composed of an input temporary stopping means that shuts off the supply of the wave detection signal to the deemphasis circuit and that is located between the same and the receiving part. Furthermore, this input temporary stopping means comprises a timing means that produces an input stop and control signal which is in substantial synchronization with the generation of the switch control signal and an analog switch means for shutting off the input of the wave detection signal to the deemphasis means by the input stop and control signal. It is desirable for a circuit that receives this analog switch means to be a voltage follower circuit.

At the time when the receiving wave is switched, there is the actual existence of a spike noise in the wave detection signal (low frequency) at the receiving part inasmuch as a phase shift is produced at the function of the receiving waves of the receiving part introduction signal. During the switching period, however, the seam of the wave detection signal is voltage-fixed by means of the voltage clamp means, with a consequent result that, for a temporary period, a masked state develops and the seam of the wave detection signal that is outputted becomes milder than the spike noise, with a result that the phase noise is restrained.

There is, however, a problem as to how such voltage-fixing can be carried out, since, it is unknown at what point of the phase the switching of the receiving wave takes place. In addition, the amplitude of the receiving wave at the time of switching is also unknown. In order to reduce the phase noise in terms of probability, therefore, it is desirable to fix it with a voltage on the zero level. This voltage can be given by an analog memory, etc. In addition, providing a sample hold circuit that maintains the voltage value of the wave detection signal immediately before switching serves to fix the wave detection signal temporarily with a voltage corresponding to the history of the wave detection waveform. Therefore, the phase noise can be reduced reliably, not in terms of probability.

Meanwhile, the phase noise becomes a problem in the FM receiver where there generally is a wave detection signal in the hearing range. This is because of the fact that the FM receiver has a deemphasis circuit that attenuates the high range of the wave detection signal that is outputted from the receiving part against the pre-emphasis circuit on the FM transmission side. The wave detection output is integrated with a prescribed time constant by the deemphasis circuit (integration circuit), with a result that a spike noise, if contained in the wave detection signal, has its high frequency component (inaudible band) integrated by its integrating circuit. In addition, its low frequency component (audible band) is intensified, the noise width is expanded and the internal noise accompanying the spike noise becomes predominant at the output of the deemphasis circuit. However, it is possible to constitute a sample hold circuit by means of a few additional parts by providing an input temporary stopping means that shuts off the supply of the wave detection signal to the deemphasis circuit between the same and the receiving part, with the deemphasis circuit being used as is.

At the time of non-switching, the wave detection signal is supplied as is to the deemphasis circuit, and a wave detection signal, demodulated by high-range attenuation, can be obtained. As the input of the deemphasis circuit is shut off by the input temporary stopping means at the time of switching, the voltage of the wave detection signal immediately before switching is maintained temporarily in the deemphasis circuit. In the input temporary stopping means, there is provided an analog switch means that generates an input stop and control signal which is in substantial synchronization with the generation of a switch control signal by a timing means and that shuts off the input of the wave detection signal to the deemphasis means by this input stop and control signal. The generation of the contact noise can be prevented by an analog switch means. In this example, a voltage follower circuit is used as a circuit for receiving the analog switch means.

Other features and advantages of the present invention will become apparent from the following description of the invention which refers to the accompanying drawings.

BRIEF DESCRIPTION OF THE DRAWINGS

FIG. 1 is a block diagram showing a diversity FM receiver of the antenna switching type according to an embodiment of the invention and FIG. 1(a) is a block diagram of a receiving unit forming part of the diversity receiver shown in FIG. 1.

DETAILED DESCRIPTION OF THE PREFERRED EMBODIMENT

Figure 1:
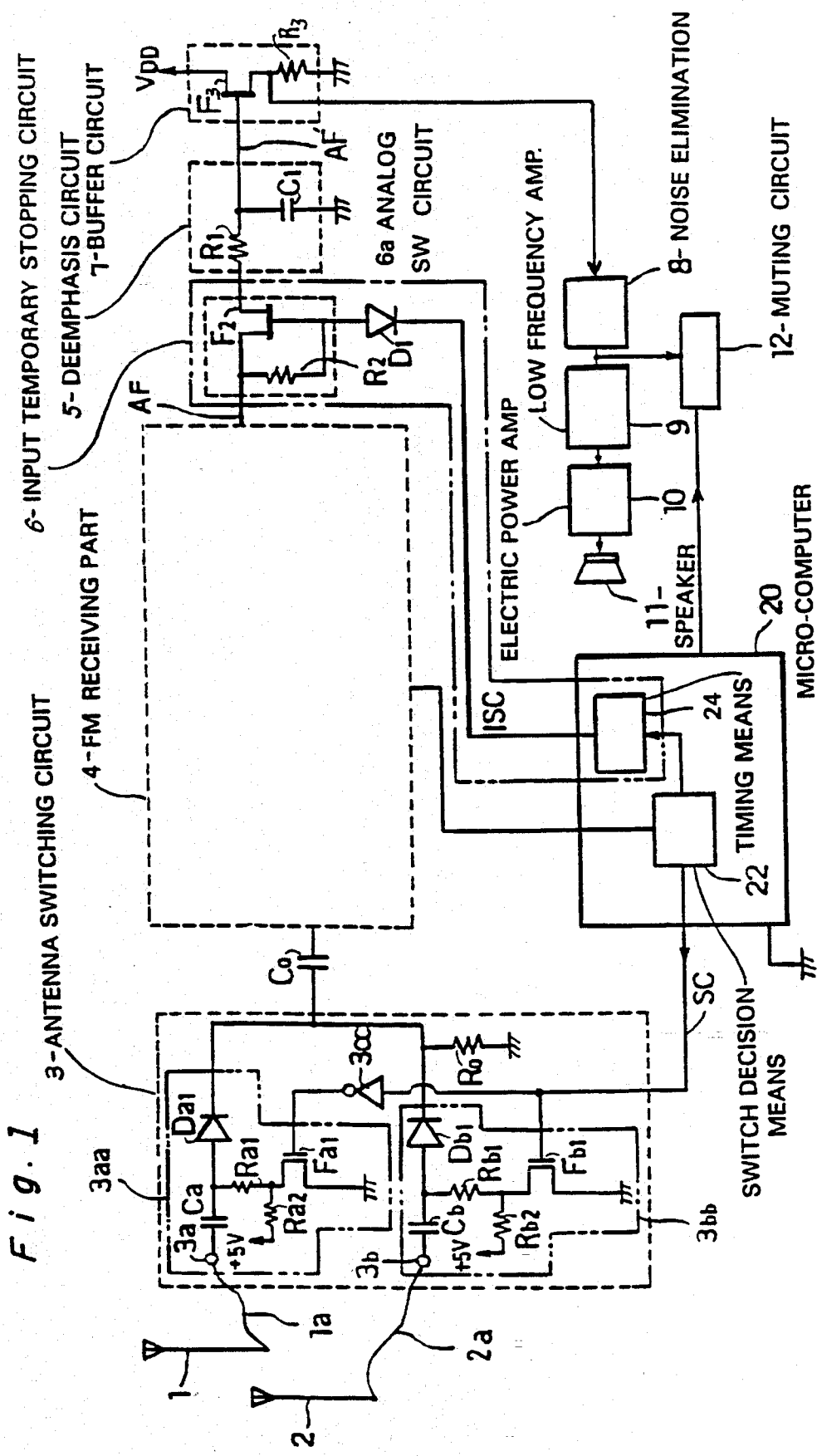

FIG. 1 is a block diagram showing a diversity FM receiver of the antenna switching type according to the preferred embodiment of this invention. This diversity FM receiver is an audio receiver of the wireless microphone system, which requires a sound signal of a high quality. The diversity FM receiver that is shown in the drawing employs the diversity method of the antenna switching system utilizing a first antenna (an aerial antenna) 1 and a second antenna 2. It has an antenna switching circuit 3, an FM receiving unit or part 4 consisting of one system, a deemphasis circuit 5, and an input temporary stopping circuit 6 constituting a phase noise restraining circuit between the FM receiving part 4 and a deemphasis circuit 5.

The first antenna 1 is connected to one input terminal 3a of the antenna switching circuit 3 through a power supply wire 1a and the second antenna 2 is connected to the other input terminal 3b of the antenna switching circuit 3 through a power supply wire 2a. The antenna switching circuit 3 has an induction switch circuit 3aa that introduces the receiving wave from the first antenna 1 or shuts it off, an induction switch circuit 3bb that introduces the receiving wave from the second antenna 2 to the receiving part 4 or shuts it off, and an inverter 3cc for exclusively switching the circuits 3aa and 3bb. The induction switch circuits 3aa and 3bb are of the same construction, comprising direct current removal condensers Ca and Cb, N channel-type MOSFETs (insulation gate type electric field effect transistors) Fal and Fbl for pulldown use and diode switches Dal and Dbl.

Between the anode of the diodes Dal and Dbl and the positive electric source (+5V), the resistances Ral and Rbl and the pull-up resistances Ra2 and Rb2 are connected in series. Between the resistance connecting point and ground, the N channel type MOSFETs (Fa1 and Fb1) are connected in series. At the gate of one N channel type MOSFET (Fb1), a switch control signal SC from the switch decision means 22 of a one-chip micro-computer (micro-processor unit MPU) 20 is impressed and, at the gate of the other N channel type MOSFET (Fa1), a switch control signal obtained by inverting the switch control signal SC with an inverter 3cc is impressed. It is mentioned in this connection that $C_0$ is a condenser for direct current component removal and $R_0$ is a resistance that pulls down the cathode side of the diodes Da1 and Db1.

The FM receiving unit 4 is of a well-known construction and, as seen in FIG. 1(a), includes a high frequency amplifying circuit 4a that amplifies the receiving wave (high frequency) that is introduced from the switching circuit 3, a frequency converting circuit 4b that converts a high frequency signal consisting of a local oscillation circuit 4bb and a mixing circuit 4ba into an intermediate frequency signal (10.7 MHz), an intermediate frequency amplifying circuit 4c that amplifies the intermediate frequency signal, an amplitude limiting or restricting circuit 4d that eliminates the amplitude modulation part of the intermediate frequency, an FM wave detection circuit 4e that takes out the sound signal (wave detection output) from the FM wave of the intermediate frequency or FM amplifying circuit 4c and an electric field intensity detecting circuit 4f that detects the electric field intensity of the receiving wave on the basis of the intermediate amplified signal from the intermediate frequency amplifying circuit 4c and that outputs its intensity signal (S meter output).

The deemphasis circuit 5 is an integrating circuit that attenuates the high sound part (high frequency range) of the sound signal AF for which wave detection has been carried out and is ordinarily composed of a resistance R1 and a condenser C1. The resistance $R_1$ and condenser $C_1$ have a time constant of 50 (mu) s when used to receive FM broadcast in the United States and a time constant of 75 (mu)s when used to receive FM broadcast in Japan.

The input temporary stopping circuit 6 is for temporarily stopping the sound signal AF from the FM wave detection circuit 4e from entering the deemphasis circuit 5 at the time when the antenna is switched and has a timing means 24 that produces an input stop and control signal ISC which is in substantial synchronization with the generation of the switch control signal SC in the one-chip microcomputer 20, a diode D1 which becomes electrically conductive by the input stop and control signal ISC and an analog switch circuit 6a that shuts off the input of the sound signal to the deemphasis circuit 5.

The diode $D_1$ and an electric current limiting resistance $R_2$ are connected in series between the output of the FM wave detection circuit 4e and the terminal of the timing means 24. The analog switch circuit 6a has an N-channel type junction FET (F2) which lies between the output terminal of the FM wave detection circuit 4e and the input terminal of the deemphasis circuit 5, thereby constituting an analog switch circuit. The ISC terminal of the timing means 24 generates an input stop and control signal ISC which is on a high level (5V) at the time of a non-switch and on a low level (OV) at the time of a switch. Following the deemphasis circuit 5, there is provided a buffer circuit 7 comprising a source follower junction FET $F_3$ and a resistance $R_3$. The deemphasis circuit 5 and the buffer circuit 7 constitute an FET activity low range pass filter.

Various circuit constructions can be used for the circuitry following the buffer circuit 7. In this embodiment, however, a noise eliminating circuit 8, a low frequency amplifying circuit 9, an electric power amplifying circuit 10 and a speaker 11 are provided, in view of the fact that this embodiment is an FM receiver used for the wireless microphone system.

In addition, there is provided a muting circuit 12 that causes the sound signal not to be added to the low frequency amplifying circuit 9 in the case where the receiving intensity is at a low level.

The one-chip micro-computer 20 is also utilized for carrying out processing other than those described in this embodiment, e.g., display control, muting control, etc.). Insofar as this embodiment is concerned, however, the micro-computer 20 includes a switch decision means 22 that produces a switch control signal SC for the antenna switching circuit 3 and a timing means 24 that produces an input stop and control signal ISC for the input temporary stopping circuit 6.

The switch decision means 22 determines the timing of the antenna switching on the basis of the receiving electric field intensity signal of the electric field intensity detecting circuit 4f in the receiving part 4 and inverts the logic level of the switch and control signal SC. The timing means 24 outputs the input stop and control signal ISC of a negative polarity pulse which drops down immediately before the level inversion of the switch control signal SC and rises up after the inversion.

As will be described later, this negative polarity pulse requires masking of the switching period. If the pulse width happens to be excessively long, it serves as a cause for the development of noise due to a local absence of the sound signal. If the maximum audible frequency is 20 KHz, it will be five (mu)s, which is 10 per cent of 50 (mu) s for one cycle, reflecting an extremely small effect upon the fidelity by the local failure of the receiving wave. As the frequency of the sound signal becomes lower, the ratio that the masking period occupies in one cycle becomes less than 10 per cent; that is 0.5 percent frequency of one KHz.

If it is assumed now that the switch control signal SC coming from the switch decision means 22 is on a high level, the MOSFET (Fb1) is in the on state and, since the inverter 3cc has an output on the low level, the MOSFET (Fa1) is in the off state. If the MOSFET (Fb1) is in the on state, the anode of the diode Db1 is on the side of ground level, with a result that no electric current flows to the diode Db1, which, therefore, remains in a non-conductive state. The receiving wave from the second antenna 2, thus, is connected to the side of ground through a condenser Cb, resistance Rb1, and the MOSFET (Fb1). If the MOSFET (Fa1) is in the off state, on the other hand, the anode of the diode Da1 is pulled up to the regular electric source, with a consequence that the diode Da1 is forward biased and stays in the electrically conductive state and the receiving wave from the first antenna 1 is introduced to the FM receiving part 4 through a condenser Ca, diode Da1 and a condenser $C_0$. In the receiving part 4, a sound signal AF (FM wave detection signal) is taken out of the high frequency receiving wave from the antenna 1, as is widely known. If the ISC output from the timing means 24 is maintained at a high level, the FET F2 of the analog switch circuit 6a is brought into an electrically conductive state as the diode D1 is nonconductive in a reverse bias state, with the sound signal AF from the FM wave detection circuit 4e being supplied to the input terminal of the deemphasis circuit 5 with low input impedance.

At the deemphasis circuit 5, the high sound range (high frequency range) of the sound signal is attenuated at 50

(mu)s, thereby improving the S/N ratio. The sound signal whose high sound range has been demodulated is outputted from the buffer circuit 7.

Figure 2:
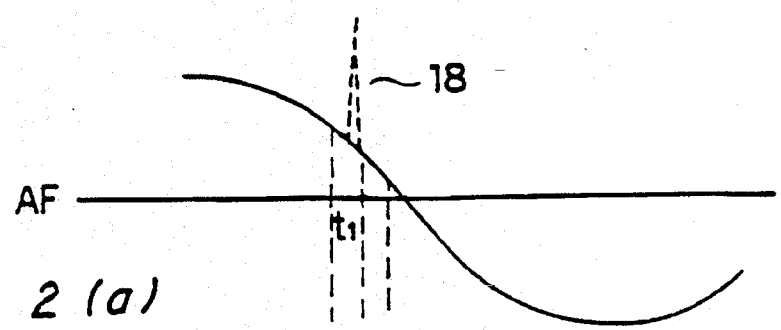
FIGS. 2(a)-2(d) are timing charts showing the major signal wave forms in the embodiment of FIG. 1.
Figure 2:
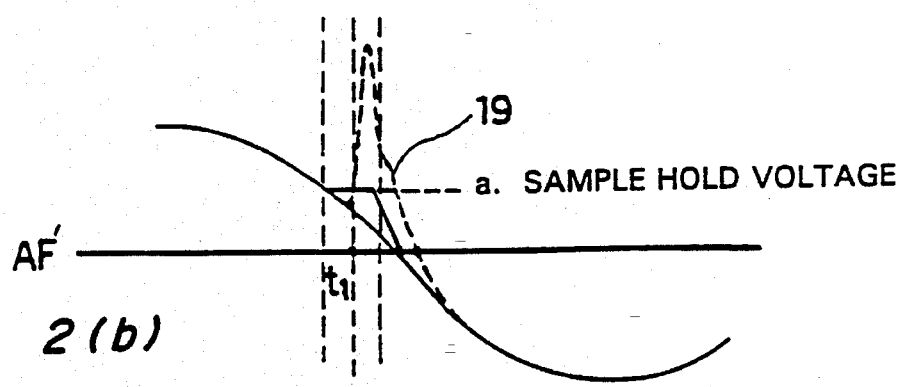
Figure 2:
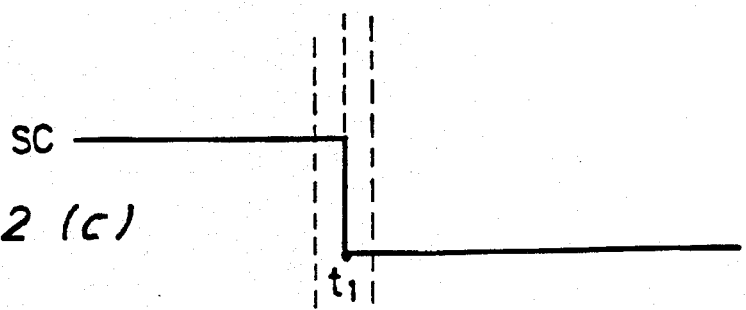
Figure 2:
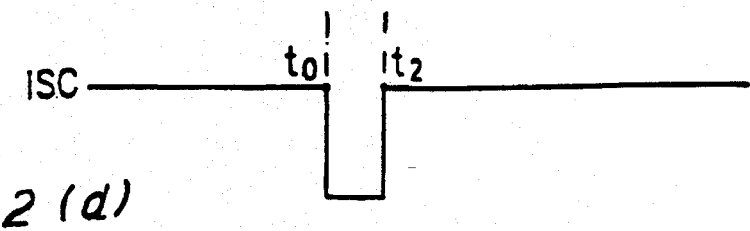

When the receiving electric field intensity of the wave coming from this first antenna 1 becomes weak, the electric field intensity signal level of the electric field intensity detection circuit 4f becomes automatically lower. As shown in FIGS. 2(a)-2(b), when said level becomes lower than a certain threshold value, as determined by the switch decision means 22, the switch control signal SC drops to a lower level at a certain point t1. Because of the drop to lower level of the switch control signal SC, the MOSFET (Fa1) is converted to the on state, while the MOSFET (Fb1) is switched to an off state, resulting in the wave received from the second antenna 2 being introduced to the FM receiving part 4. As is known in the prior art, since a phase shift is produced between the receiving wave prior to switching and the receiving wave after switching due to the switching introduction of this receiving wave, a spike noise 18 is inevitably produced in the neighborhood of the time t1, as shown in FIG. 2(a), in the sound signal which is the output of the wave detection circuit 4e, with this spike noise 18 being sent as it is to the deemphasis circuit 5 and the spike noise, too, being integrated at the deemphasis circuit 5 with a time constant of 50 (mu)s. Accordingly, a phase noise 19 with a large noise width is superimposed on the output AF' of the deemphasis circuit 5 as is shown in FIG. 2(b).

In this example, however, as shown in FIG. 2(c), there is generated an input temporary stop and control signal ISC which is a negative polarity pulse which drops down immediately before the time of a level change of the switch control signal SC (before two (mu) s) and stands up immediately after the time of said change, with a consequence that the transmission of the spike noise 18 is prevented. In other words, if the input temporary stop and control signal ISC drops down to a low level, the diode switch D1 assumes a forward biased state, thereby assuming an electrically conductive state, with a result that the FET (F2) is switched to the off state, thereby breaking the connection between the output terminal of the wave detection circuit 4e and the input terminal of the deemphasis circuit 5 and causing the sound signal AF not to be supplied to the deemphasis circuit 5. Because of this, the spike noise 18 which is generated in the period between time t0 and time t2 (the masking period) is not supplied to the deemphasis circuit 5.

During the masking period involving this switch over, the deemphasis circuit 5, which is an integrating circuit, maintains the voltage value of the sound signal at point t0 to point t2. Because of this, the output AF' of the deemphasis circuit 5 assumes a state in which the history of the sound signal prior to switching at point t2 is reflected, with a consequence that the continuity (slope) of the waveform after switching becomes smooth, thereby expanding the effect of restraining the phase noise.

Since this deemphasis circuit 5 and the input temporary stopping circuit 6 constitute a sample hold circuit, the holding voltage of the sound signal at time t0 is the sample hold voltage.

This embodiment is characterized in that an input temporary stopping circuit 6 is provided in front of the deemphasis circuit 5, thereby constituting a sample hold circuit, for the purpose of restraining an expansion of the phase noise by the deemphasis circuit 5 which is ordinarily provided in the existing FM receiver.

Here, it is possible to shorten the masking period (t0 through t2). A sufficient leeway is provided for the masking period (five (mu)s) from the standpoint of design. If the signal delay time can be confirmed, however, the times t0 and t2 can be adjusted, thereby shortening the masking period. In addition, it is possible to provide such a circuit construction and program that the time t0 and t2 can be adjusted by means of a variable resistance, etc. after the mounting of the circuit.

Although the invention has been described in connection with an FM receiver, the invention can be used in an AM receiver and a PM receiver, etc. The phase noise can be reduced probability-wise by employing an analog memory that impresses voltage, etc. during the masking period instead of providing a sample hold circuit. Further, the spike noise can be mitigated by using a low pass filter (cutoff frequency approximately 100 KHz and the rate of attenuation approximately 60 dB), which is sharp, against the sound signal after FM wave detection. Moreover, while this embodiment was directed to a diversity receiver of the antenna switching type, it is understood that it can also be used in a diversity receiver of the type whereby the received wave or its delayed wave is switched and synthesized as described in the aforementioned U.S. Pat. No. 4,293,955. In addition, switching control using the switching means as described in this embodiment is conventional; however, it is also possible to employ such switching control as is described in the aforementioned Patent Kokai No. Sho 62-47223.

Further, this invention can be used not only in audio machines but also in receivers for data transmission like MSK or FSK, etc.

As has been described above, this invention which is characterized in that there is provided a voltage clamping means for temporarily fixing the voltage of the wave detection signal during the switching period of the receiving wave has the following effects:

(1) Since a phase shift is produced at the seam of the receiving waves of the receiving part introduction signal at the time of switching, there actually exists a spike noise in the wave detection signal in the receiving part. During the switching period, however, the seam of the wave detection signal is voltage-fixed by means of a voltage clamping means, thereby bringing about a temporary masked state. Because of this, the seam part of the wave detection signal that is outputted becomes milder than the spike noise, with a result that the phase noise is restrained. As a result of this, it becomes possible to use the diversity receiver of the antenna switching system even in those receivers where a high S/N ratio is required. Since the receiving part of one single system is sufficient, this invention can offer a receiver of high reliability at low cost as the number of parts required is approximately reduced by 50 per cent as compared with the diversity receiver having two system receiving parts according to prior art.

(2) As the wave detection signal can be temporarily fixed by a voltage corresponding to the history of the wave detection waveform by using a sample hold circuit that maintains the voltage value of the wave detection signal immediately before switching as a voltage clamping means, it is possible to accurately reduce the phase noise, not just in terms of probability.

(3) In the FM receiver, in particular, the wave detection output is integrated with a prescribed time constant by the deemphasis circuit (integrating circuit), with a consequence that, if a spike noise is contained in the wave detection signal, the high wave component (non-audible band) of the spike noise is integrated in its integrating circuit, with a result that the low wave component (audible band) is reinforced and this leads to an expansion of the noise width and that the internal noise accompanying the spike noise becomes predominant over the output of the deemphasis circuit. In the case where this invention is used, however, a sample hold circuit is formed by using a few parts by using the deemphasis circuit as-it is and by providing an input temporary stopping means that shuts off the supply of the wave detection signal to the deemphasis circuit between the deemphasis circuit and the receiving part, thereby offering an FM receiver of high quality at low cost.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A diversity receiver for receiving signals transmitted at carrier frequencies, which comprises:

means including a plurality of antennas for receiving a plurality of signals;

means for processing the received signals in accordance with a first mode or a second mode and for generating a receiving unit introduction signal;

a receiving unit for demodulating the receiving unit introduction signal and for generating a wave detection signal;

means for detecting the amplitude of the receiving unit introduction signal;

means for switching from one of the first and second modes to the other mode in accordance with the detected amplitude of the receiving unit introduction signal; and voltage clamp means for clamping the voltage of the wave detection signal during the switching from one of the first and second modes to the other mode.

2. A diversity receiver as in claim 1, wherein, in the first mode, the receiving unit introduction signal is the signal received from the first antenna and, in the second mode, the receiving unit introduction signal is the signal received from the second antenna.

3. A diversity receiver for receiving signals transmitted at carrier frequencies, which comprises:

means including a plurality of antennas for receiving a plurality of signals;

means for processing the received signals in accordance with a first mode or a second mode and for generating a receiving unit introduction signal;

a receiving unit for demodulating the receiving unit introduction signal and for generating a wave detection signal, in the first mode the receiving unit introduction signal being the signal received from the first antenna and, in the second mode, the receiving unit introduction signal being the signal received from the second antenna, means for detecting the amplitude of the receiving unit introduction signal;

means for switching from one of the first and second modes to the other mode in accordance with the detected amplitude of the receiving unit introduction signal; and voltage clamp means for clamping the voltage of the wave detection signal during the switching from one of the first and second modes to the other mode, the voltage clamp means comprising a sample hold circuit which contains the voltage value of the wave detection signal at the value of said wave detection signal immediately before switching from one of the first and second modes to the other mode.

4. A diversity receiver as in claim 3, in wherein the receiving unit is an FM receiving part.

5. A diversity receiver as in claim 4, wherein the sample hold circuit includes a deemphasis circuit for attenuating the high range of the wave detection signal and an input temporary stopping means for blocking the wave detection signal from the deemphasis circuit.

6. A diversity receiver as set forth in claim 5, wherein the input temporary stopping means includes (*a*) timing means for generating a control signal, said timing means generating said control signal in synchronism with switching by the switching means from one of the first and second modes to the other mode, and (*b*) analog means responsive to said control signal from the timing means for blocking the wave detection signal from the deemphasis circuit.

7. A diversity receiver as in claim 6, which includes a voltage follower circuit connected to the deemphasis circuit.

* * * * *

UNITED STATES PATENT AND TRADEMARK OFFICE
CERTIFICATE OF CORRECTION

PATENT NO. : 5,465,411
DATED : November 7, 1995
INVENTOR(S) : Yukinaga KOIKE

It is certified that error appears in the above-indentified patent and that said Letters Patent is hereby corrected as shown below:

TITLE PAGE:

Item [73], the fourth Assignee "Samsun Technologies Corporation, Hicksville, N.Y." should read --Samson Technologies Corporation, Syosset, N.Y.--

Signed and Sealed this

Eleventh Day of June, 1996

Attest:

BRUCE LEHMAN

*Attesting Officer*    *Commissioner of Patents and Trademarks*